United States Patent [19]

Sideman et al.

[11] Patent Number: 5,441,563
[45] Date of Patent: Aug. 15, 1995

[54] HIGHLY INSOLUBLE AZOLE EMBOSSING INHIBITOR AND THE USE THEREOF

[75] Inventors: Carl E. Sideman, Lititz, Pa.; Donald M. Snyder, Ypsilanti, Mich.; Anthony L. Wiker, Lancaster, Pa.; John E. Herweh, Lancaster, Pa.; Joseph F. Remar, Lancaster, Pa.

[73] Assignee: Armstrong World Industries, Inc., Lancaster, Pa.

[21] Appl. No.: 271,633

[22] Filed: Jul. 7, 1994

Related U.S. Application Data

[63] Continuation-in-part of Ser. No. 87,488, Jul. 6, 1993, abandoned.

[51] Int. Cl.$^6$ ............................................. C09D 11/02
[52] U.S. Cl. .................................. 106/224; 106/20 R
[58] Field of Search ...................... 106/22 H, 20 R; 544/366; 548/257, 304.7, 309.7

[56] References Cited

U.S. PATENT DOCUMENTS

| | | | |
|---|---|---|---|
| 3,293,094 | 12/1966 | Nairn et al. | 156/79 |
| 4,083,907 | 4/1978 | Hamilton | 264/52 |
| 4,191,581 | 3/1980 | Hamilton | 106/20 R |
| 4,369,065 | 1/1983 | Brixius | 106/27 |
| 4,407,882 | 10/1983 | Hauser et al. | 106/22 H |
| 4,408,049 | 10/1983 | Gall | 544/366 |
| 4,421,561 | 12/1983 | Brixius | 106/27 |
| 4,421,753 | 12/1983 | Tomcufcik et al. | 544/366 |
| 4,522,785 | 6/1985 | D'Errico | 252/390 |
| 4,788,292 | 11/1988 | Clark et al. | 548/260 |
| 5,196,435 | 12/1992 | Sherman et al. | 106/20 R |
| 5,254,159 | 10/1993 | Gundlach et al. | 106/22 K |
| 5,336,693 | 8/1994 | Frisch | 106/22 H |

FOREIGN PATENT DOCUMENTS 1466558  3/1977  United Kingdom ................... 235/8

OTHER PUBLICATIONS

Mozillis, V. V. and Jokubaityte, S. P., "The Benzotriazole and Thiourea in Mannich Reaction", *Works of the Academy of Scs. of the Lithuanian SSR*, Series B, vol. 1(60), (1970).

Katritzky, A. R. et al., "Reactions of Benzotriazole with Formaldehyde and Aliphatic Primary Amines", *J. Chem. Soc.*, (1990), pp. 541–547.

Katritzky, A. R. and Hughes, C. V., "The Chemistry of N-Substituted Benzotriazoles" *Chemica Scripta*, vol. 29, (1989), pp. 27–31.

*Primary Examiner*—Helene Klemanski

[57] ABSTRACT

A high melting solid aromatic or cycloaliphatic azole-based chemical embossing inhibitor is essentially insoluble and inert in water and/or water alcohol mixtures. These solid azoles can be readily micronized and dispersed into water-based printing inks for use in producing textured foamed plastic surfaces. These compounds comprise a general class of 1-N substituted aminomethylaryl- or cyclohexyltriazole and imidazole derivatives. Some of the preferred compounds are symmetrical di-functional triazole derivatives and some of the preferred embodiments have a carboxy moiety or a sulfonyl moiety attached to a nitrogen atom.

17 Claims, No Drawings

HIGHLY INSOLUBLE AZOLE EMBOSSING INHIBITOR AND THE USE THEREOF

This application is a continuation-in-part application of application Ser. No. 87,488, which was filed Jul. 6, 1993, now abandoned.

FIELD OF THE INVENTION

The invention relates to blowing agent inhibitors and their use. In particular, the invention is directed to highly insoluble azoles, particularly benzotriazole and benzimidazole derivatives, which are effective blowing agent inhibitors. The inhibitors are substantially insoluble in both water and alcohol and are capable of being ground and dispersed in situ in an ink composition.

BACKGROUND OF THE INVENTION

It is well known to those skilled in the art that foamed plastic surfaces may be textured by the process commonly referred to as "chemical embossing", wherein the surface of a foamable polymer composition is printed with an ink composition containing an agent which inhibits foaming in the printed areas when the foamable polymer composition is subsequently subjected to a heat treatment. The areas which have not been printed over thus expand normally on heating while expansion in the printed areas containing the inhibitor is retarded, resulting in a textured surface with depressions in those areas printed with the inhibited ink.

A wide range of compounds have been claimed to act as inhibitors for chemical embossing of floor and wall covering surfaces. Carboxylic acid anhydrides such as trimellitic anhydride (TMA), disclosed in Nairn et al. U.S. Pat. No. 3,293,094, being among the most commonly used industrially. However, compounds such as TMA, while suitable for solvent-based printing inks, are hydrolytically unstable and thus are not readily usable in the aqueous ink formulations which are rapidly gaining in importance in large scale printing operations due to environmental concerns over VOC (volatile organic compound) emissions from solvent-based inks.

Triazole compounds such as benzotriazole (BTA) and tolyltriazole (TTA) are also widely used in solvent-based inks for chemical embossing. These compounds do not hydrolyze on contact with water as do carboxylic acid anhydrides like TMA. However their use in aqueous ink systems is hindered by a lack of substantial water solubility.

The excellent embossing characteristics, stability and low toxicity of the aromatic triazoles have prompted considerable research into ways that these compounds could be successfully adapted to aqueous ink systems. The prior art, specifically Hamilton U.S. Pat. No. 4,083,907 and Hamilton U.S. Pat. No. 4,191,581, has established that sufficient BTA or aminotriazole for acceptable embossing can be solubilized into an aqueous ink by addition of a water soluble alcohol and buffering agents to raise the pH of the ink formulation to between 8-12.

Certain carboxylic acids, acid anhydrides and acid halides have also been claimed to act as foam-expansion inhibitors in aqueous ink formulations where the acidic species have been neutralized and the formulation pH adjusted to the same 8-12 range (Brixius U.S. Pat. No. 4,369,065 and Brixius U.S. Pat. No. 4,421,561).

Benzotriazole and other inhibitor species have also been solubilized in alcohol-containing aqueous inks where the system pH is in the acidic range from 3-5 (Sherman et al. U.S. Pat. No. 5,169,435).

Modified aromatic azole derivatives have also been cited as foam-expansion inhibitors. These compounds are substituted on the 1-N of the triazole or imidazole ring with dialkylaminomethyl groups of varying structure and are claimed to be easily incorporated into aqueous inks which contain alcohols or other water soluble organic solvents, and do not require the use of a pH regulator (Hauser et al. U.S. Pat. No. 4,407,882). Compounds of this general structure in which the alkyl groups of the aminomethyl substituent are simple hydrocarbons (D'Errico U.S. Pat. No. 4,522,785) and perfluoroalkyls (Clark et al. U.S. Pat. No. 4,788,292) have also been claimed as corrosion inhibitors.

Enhancement of the solubility of such derivatives in a wide range of functional fluids of varying polarity have been investigated. Popplewell et al. U.K. Patent No. 1,466,558 discloses mono- and di-(methyl benzo- and naphthoazole) substituted amino corrosion inhibitors.

Synthesis of benzotriazole derivatives is disclosed in Mozilis, V. V. and Jokubaityte, S. P. "The Benzotriazole and Thiourea in Mannich Reaction." *Works of the Academy of Sciences of the Lithuanian SSR*, Vol. 1(60), (1970) (Chem. Abstr. 70 77152r (1970)); Katritzky, A. R., Pilarski, B. and Urogdi, L. "Reactions of Benzotriazole with Formaldehyde and Aliphatic Primary Amines." *J. Chem. Soc.*, (1990), pp. 541-7; Katritzky, A. R. and Hughes, C. V. "The Chemistry of N-Substituted Benzotriazoles." *Chemica Scripta*, Vol 29, (1989), pp. 27-31; Katritzky, A. R., Yao, G., Lan, X. and Zhao, X., *J. Org. Chem.* 1993, 58 2086; Katritzky, A. R., Jurczyk, S., Rachwal, B., Rachwal S., Shcherbakova, I. and Yannakosoulou, K., *Synthesis* 1992, 1295; and Katritzky, A. R., Rachwal, S. and Rachwal, B., *J. Chem. Soc.* Perkin Trans I 1987, 799.

Frisch WO 89/04341 suggests directly incorporating benzotriazole or tolyltriazole inhibitors as solid powders into aqueous ink. This approach to chemical embossing is complicated by the slight-to-moderate solubility of these compounds in the variable water/alcohol mixtures routinely found in aqueous ink formulations. Affinity for the solvent can lead to inhibitor particle agglomeration. Interaction with the ink resins/surfactants can cause destabilization (e.g. flocculation) of the pigments and cause ink tack during printing and drying.

As the azole-based foam-expansion inhibitors established in the patent literature to date are either liquids or not soluble in water unless alcohols or other suitably water-miscible organic cosolvents are also present, and do not readily form stable aqueous ink-compatible dispersions, there continues to exist a need in the art for an azole-based inhibitor which can be readily dispersed into an aqueous-based printing ink, both anionic and cationic, without compromising the ink stability or printing characteristics.

SUMMARY OF THE INVENTION

The dialkylaminomethylazole derivatives cited previously as foam-expansion inhibitors and corrosion inhibitors are readily prepared by the known reaction of the starting triazole or imidazole with a secondary amine and formaldehyde in a suitable solvent at varying temperatures. Although the use of piperazine as a starting material in such derivatives has been cited in Hauser et al. U.S. Pat. No. 4,407,882, there is no indication in the Hauser et al. patent that the piperazine derivative was actually made. Hauser et al. disclose that their inhibitors form aqueous solutions. Further, the piperazine compound disclosed by Hauser et al. was the monofunctional derivative.

In the present invention, azole derivatives such as benzotriazole, tolyltriazole and benzimidazole have been found to be crystalline solids of very high melting point and unusually low solubility in many solvents, including water and isopropyl alcohol. These derivatives can be readily micronized and dispersed into aqueous inks of widely varying composition with no adverse impact on the stability of the ink or its printing and drying characteristics. Further, because of their very low solubility, these derivatives can be dispersed into typical ink compositions and ground in situ without adverse effects on the ink composition.

Relative to BTA, TTA and other aminomethyltriazole derivatives, the present inhibitors are also significantly less prone to undesirable post-printing migration, a problem commonly encountered in the process of chemical embossing. The inhibitors of the prior art diffuse, typically upward from the printed surface into the bottom of the adjacent layer of foamable plastic substrate when a continuous sheet is tightly wound and stored before further processing. This inhibitor contact-migration results in formation of faint images in the non-embossed areas of the surface, a phenomenon commonly referred to as "ghost embossing".

Accordingly, an object of the present invention is to provide an inhibitor for water-based inks which is universally compatible, does not destabilize the ink, dries without any tack, embosses satisfactorily and shows significantly reduced ghosting characteristics.

The term "azole" as used herein includes benzotriazole, tolyltriazole, naphthotriazole, cycloaliphatic triazole, benzimidazole, tolylimidazole, naphthimidazole, and their cycloaliphatic imidazole derivatives, and preferably those which have a room temperature aqueous solubility of less than 0.1% by weight or a room temperature isopropyl alcohol solubility of less than 5% by weight. These derivatives do not interfere with the ink stability or drying characteristics of the ink composition. Therefore, the liquid ink has excellent shelf-life and dries without becoming tacky.

It is also an object of the present invention to provide a printing ink composition for the production of textured foamed surfaces, which composition comprises a binder resin, solvent, and a blowing agent inhibitor having the general formula below.

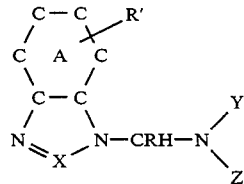

wherein the A ring is benzenoid, napthenoid or saturated cycloaliphatic, the A ring being unsubstituted or substituted with R' which is an alkyl group of 1 to 4 carbon atoms, R being a hydrogen atom or a methyl radical, X being a nitrogen atom or the

group, wherein R" is a hydrogen atom or an alkyl group of 1 to 4 carbon atoms, Y and Z are organic moieties or when taken together with the nitrogen to which they are attached form an organic ring structure, the inhibitor having a 24 hour room temperature aqueous solubility of less than 0.1% by weight or a 24 hour room temperature isopropyl alcohol solubility of less than 5% by weight.

Another object of the present invention is to provide a printing ink composition for the production of textured foamed surfaces, which composition comprises a binder resin, solvent, and a blowing agent inhibitor having the general formula

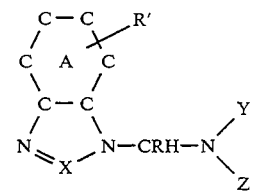

wherein the A ring is benzenoid, napthenoid or saturated cycloaliphatic, the A ring being unsubstituted or substituted with R' which is an alkyl group of 1 to 4 carbon atoms; R is a hydrogen atom or methyl radical; X is a nitrogen atom or the

group, wherein R" is a hydrogen atom or an alkyl group of 1 to 4 carbon atoms; Y is selected from the group consisting of hydrogen atom, an alkyl group of 1 to 4 carbon atoms, an hydroxyl moiety and a carboxy containing moiety; and Z is selected from the group consisting of methyl benzotriazole, methyl tolyltriazole, a carbonyl or thiocarbonyl linked methyl benzotriazole or methyl tolyltriazole containing moiety, and a sulfonyl linked moiety; or Y and Z taken together form a saturated ring compound containing a carbonyl group, or having a methyl benzotriazole or methyl tolyltriazole containing moiety attached thereto. Preferably the solvent is water.

Still another object of the present invention is to provide a printing ink composition for the production of textured foamed surfaces, which composition comprises a binder resin, solvent, and a blowing agent inhibitor having the general formula

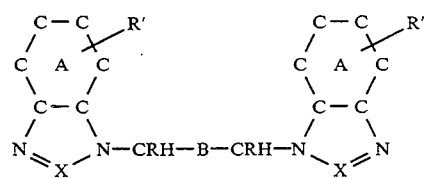

wherein the A ring is benzenoid, napthenoid or saturated cycloaliphatic, the A ring being unsubstituted or substituted with R' which is an alkyl group of 1 to 4 carbon atoms; R is a hydrogen atom or a methyl radical; X is a nitrogen atom or the

=C—R"

group, wherein R" is a hydrogen atom or an alkyl group of 1 to 4 carbon atoms; B is selected from the group consisting of NH, NOH and an organic moiety; and both C—B bonds are carbon/nitrogen bonds. Preferably, both X's are a nitrogen atom. In a more preferred embodiment, B is selected from the group consisting of organic substituted nitrogen, organic substituted nitrogen/carbonyl/nitrogen, organic substituted nitrogen/carbonyl/nitrogen/carbonyl/nitrogen, and organic substituted or unsubstituted saturated heterocyclic ring.

Yet another object of the present invention is to provide a printing ink composition comprising a resin, a solvent and an inhibitor; the inhibitor being a compound having at least two moieties selected from the group consisting of 1-methyl benzotriazole moiety, 1-ethyl benzotriazole moiety, 1-methyl benzimidazole moiety, 1-ethyl benzimidazole moiety, 1-methyl tolyltriazole moiety and 1-ethyl tolyltriazole moiety, the selected moieties being attached to one or more nitrogen atoms.

Another object of the present invention is to provide a printing ink composition comprising a resin, a solvent and an inhibitor; the inhibitor being a compound having at least one moiety selected from the group consisting of 1-methyl benzotriazole moiety, 1-ethyl benzotriazole moiety, 1-methyl tolyltriazole moiety and 1-ethyl tolyltriazole moiety, the selected moiety being attached to a nitrogen atom; and the inhibitor being a compound having at least one carboxy moiety.

And another object of the present invention is to provide a printing ink composition comprising a resin, a solvent and an inhibitor; the inhibitor being a compound having at least one moiety selected from the group consisting of 1-methyl benzotriazole moiety, 1-ethyl benzotriazole moiety, 1-methyl tolyltriazole moiety and 1-ethyl tolyltriazole moiety, the selected moiety being attached to a nitrogen atom; and the inhibitor being a compound having at least one sulfonyl moiety attached to a nitrogen atom.

A further object is to provide a printing ink composition comprising a resin, a solvent and benzimidazole inhibitor. Preferably, the solvent is water.

Another object is to provide a new compound of the formula

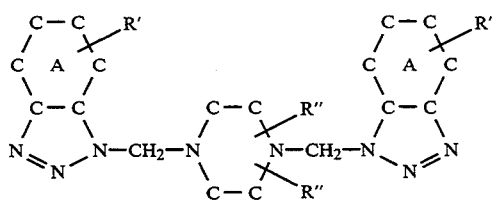

wherein the A ring is benzenoid and R' is a hydrogen atom or an alkyl group of 2 to 4 carbon atoms, or the A ring is saturated cycloaliphatic or napthenoid and R' is a hydrogen atom or an alkyl group of 1 to 4 carbon atoms, and R" is a hydrogen atom or an alkyl group of 1 to 4 carbon atoms; or the compound is selected from the group consisting of 1,3-bis(5'-tolyltriazol-1'-yl methyl) urea, 1,5-bis(benzotriazol-1'-yl methyl) biuret, 2,3,6-tris(benzotriazol-1'-yl methyl)-s-triazine, 2,4-bis(-benzotriazol-1'-yl methyl) benzoguanamine, N,N-bis(-benzotriazol-1-yl methyl) glycine, 1(1',5'-naphthalene disulfonamido) methyl benzotriazole, 1(1',3'-benzene disulfonamido) methyl benzotriazole, 1-bis(benzotriazol-1'-yl methyl)-2-benzoyl hydrazide, bis(benzotriazol-1-yl methyl) amine, 1,3-bis(5'-butyl benzotriazol-1'-yl methyl) urea and N,N'-bis(benzimidazol-1-yl methyl) piperazine.

A further object of the invention is to provide a method of embossing a heat-foamable resinous material by applying the printing ink composition of the present invention to selected areas of the surface of a heat-foamable resinous material, which material contains a blowing agent, and subsequently heating the material to or above the decomposition temperature of the activated blowing agent.

The chemical embossing inhibitors embodied in this invention have the advantage that they are insoluble or substantially insoluble in water, water/alcohol mixtures and many organic solvents, and can be used to form stable dispersions which do not adversely effect the stability and printing characteristics of either anionic or cationic aqueous printing inks of widely varying compositions. The compounds are also significantly less prone to uncontrolled lateral migration and migration through the foamable substrate than the commonly used benzo- and tolyltriazole inhibitors. Therefore, the resulting image is sharper and more distinct, as well as ghost embossing being reduced.

DETAILED DESCRIPTION OF THE INVENTION

The preferred structures of the highly insoluble azoles of this invention are those in which the A ring is a benzenoid, R is hydrogen, R' is hydrogen or methyl and X is a nitrogen atom. The most active inhibitors of the present invention which have been made are those having a 1-methyl benzotriazole moiety attached to a nitrogen atom and a second 1-methyl benzotriazole, carboxy containing or sulfonyl linking moiety attached to the same or different nitrogen atom.

The inhibitors which have been tested include 1,3-bis(benzotriazol-1'-yl methyl) urea; 1,3-bis(5'-tolyltriazol-1'-yl methyl) urea; 1,5-bis(benzotriazol-1'-yl methyl) biuret; 2,4,6-tris(benzotriazol-1'-yl methyl)-s-triazine; 2,4-bis(benzotriazol-1'-yl methyl) benzoguanamine; 1,3-bis(benzotriazol-1'-yl methyl) N,N'-dimethyl urea 1-(1'-methanesulfonamido)methyl benzotriazole; 1-(1'-benzenesulfonamido) methyl benzotriazole; 4-(benzotriazol-1'-yl methyl) hydantoin; 1-(1'-(2'-oxopyrrolidin-1'-yl) ethyl) benzotriazole N,N-bis(benzotriazol-1-yl methyl) hydroxylamine; N-(benzotriazol-1-yl methyl)-4'-carboxybenzene sulfonamide; N,N-bis(benzotriazol-1-yl methyl) glycine; 1,3-bis(benzotriazol-1'-yl methyl) thiourea 1(1',5'-naphthalene disulfonamido) methyl benzotriazole; N,N'-bis(tolyltriazol-1-yl methyl) piperazine; N,N'-bis(benzotriazol-1-yl methyl) piperazine; N,N'-bis(methylcyclohexyltriazol-1-yl methyl) piperazine; 1(1',3'-benzene disulfonamido) methyl benzotriazole; 1-bis(benzotriazol-1'-yl methyl)-2-benzoyl hydrazide; bis(benzotriazol-1-yl methyl) amine; 1,3-bis(5'-butyl benzotriazol-1-yl methyl) urea; benzimidazole; and N,N'-bis(benzimidazol-1-yl methyl) piperazine. The following compounds are new compounds, not known to the present inventors to have been previously synthesized, 1,3-bis(5'-tolyltriazol-1'-yl methyl) urea; 1,5-bis(benzotriazol-1'-yl methyl) biuret; 2,4,6-tris(benzotriazol-1'-yl methyl)-s-triazine; 2,4-bis(benzotriazol-1'-yl methyl) benzoguanamine N,N-bis(benzotriazol-1-yl methyl) glycine; 1(1',5'-naphthalene disulfonamido) methyl benzotriazole; N,N'-bis(benzotriazol-1-yl methyl) piperazine; N,N'-bis(methylcyclohexyltriazol-1-yl methyl) piperazine; 1(1',3'-benzene disulfonamido) methyl benzotriazole; 1-bis(benzotriazol-1'-yl methyl)-2-benzoyl hydrazide bis(benzotriazol-1-yl methyl) amine; 1,3-bis(5'-butyl benzotriazol-1'-yl methyl) urea and N,N'-bis(benzimidazol-1-yl methyl) piperazine and N-(benzotriazol-1-yl methyl)-4'-carboxybenzene sulfonamide. Though not made, it is expected that N,N'-bis(cyclohexyltriazol-1-yl methyl) piperazine would be an effective inhibitor.

For acceptable processing, it is advantageous to use 1 to 15 percent by weight of the insoluble azole dispersed in the aqueous printing ink composition, and preferably 5 to 10 percent by weight for floor covering applications. Higher concentrations can be used (>15%) depending on the application weight of the wet applied ink. Shallower engraved cylinders may require more inhibitor per unit area to get the desired embossed effect.

Those skilled in the art will recognize that a very wide range of printing ink compositions exist with varying combinations of resin binders, pigments, inhibitors and rheology-control additives. The pigments are optional, since it may be desirable to use a colorless, inhibitor containing printing ink. The insoluble azole compounds of this invention are potentially useful in many other aqueous or solvent ink formulations not specifically outlined in the Examples as to their exact composition.

Those skilled in the art will also recognize that varying amounts of water will be required to adjust the viscosity of the ink composition to a range suitable for typical rotogravure printing. Other methods of printing the ink composition onto the foamable plastic surface, such as screen printing, relief printing, or planographic printing, may also be used with these ink compositions.

Although this invention is primarily concerned with polyvinylchloride-based plastisol compositions thermally blown with azodicarbonamide or other blowing agents as the printing substrate, there likewise exists a wide range of resins which can be thermally foamed with azodicarbonamide and thus are potential substrates for aqueous inhibitor printing ink compositions of the type claimed. Such other compositions include polyvinyl acetate, copolymers of vinyl chloride and vinyl acetate, polyacrylate, polymethacrylate, polyethylene, polystyrene, butadiene/styrene copolymers, butadiene/acrylonitrile copolymers, and natural or synthetic rubbers.

The specific combinations of PVC, other resins, filler, stabilizers, plasticizers, chemical blowing agents and activators that make up a typical foamable plastisol substrate vary widely within certain limits and those skilled in the art can reasonably anticipate systems which would be encompassed by the scope of this invention.

The invention is illustrated by the following examples related to synthesis of the insoluble azole derivatives, preparation of the aqueous dispersions and printing ink formulations, and demonstration of the chemical embossing behavior of the claimed compounds. Unless otherwise stated, all amounts and percentages given in the Examples are on a weight basis.

EXAMPLE 1

Preparation of N,N'-Bis(Tolyltriazol-1-yl Methyl) Piperazine (TTA-P)

In a flask, were combined 133.13 parts of commercial tolyltriazole (TT100, an isomer mixture from PMC Specialties) and 43.1 parts piperazine in 700 parts methanol and cooled to zero degrees Centigrade. While holding the reaction mixture at this temperature, 81.2 parts of commercial aqueous 37% formaldehyde solution was added slowly over several hours with continual agitation, during which time a finely divided white solid began to precipitate. The reaction mixture was allowed to warm to ambient temperature and worked up after 48 hours by suction filtration. The filter cake was washed once by suspending the solid in a fresh charge of methanol and applying vacuum to remove the liquid. The resulting material was dried under moderate vacuum at 65°–75° C. to give 181.7 parts (96.5% yield) of a white powdery solid which was identified by standard spectroscopic techniques as TTA-P; N,N'-bis(-tolyltriazol-1-yl methyl) piperazine.

EXAMPLE 2

Preparation of N,N'-Bis(Benzotriazol-1-yl Methyl) Piperazine (BTA-P)

In a flask, were combined 119.13 parts of commercial benzotriazole (Cobratec 99 from PMC Specialties) and 43.1 parts piperazine in 500 parts methanol and treated with 81.2 parts of commercial aqueous 37% formaldehyde solution at zero degrees Centigrade as in Example 1. After 48 hours at room temperature, the resulting solid product was filtered, methanol washed and dried under moderate vacuum at 65°–75° C. to give 170.4 parts (97.8% yield) of white powder which was identified by standard spectroscopic techniques as BTA-P; N,N'-bis(benzotriazol-1-yl methyl) piperazine.

EXAMPLE 3

Preparation of N,N'-Bis(Methylcyclohexyltriazol-1-yl Methyl) Piperazine (HTTA-P)

In a flask, were combined 178.1 parts of hydrogenated tolyltriazole (Cobratec 911 from PMC Specialties) and 55.1 parts piperazine in 500 parts methanol and treated with 103.8 parts of commercial aqueous 37% formaldehyde solution at zero degrees Centigrade as in Examples 1 and 2. After 48 hours at room temperature, the resulting solid product was filtered, methanol washed and dried under moderate vacuum at 65°–75° C. to give 200.1 parts (80.5% yield) of white powder which was identified by standard spectroscopic techniques as HTTA-P; N,N'-bis(methylcyclohexyltriazol-1-yl methyl) piperazine.

EXAMPLE 4

Preparation of Cationic Dispersion of TTA-P

A cationic dispersion of TTA-P was prepared using a quaternary ammonium salt, stearyl dimethylbenzylammonium chloride, (Maquat SC-18, Mason Chemical Co.), as the stabilizer. The product was first diminutized by grinding the coarse powder (TTA-P) for approximately 18 hours in a standard ball mill using a combination of 12 mm diameter spherical and 6 mm diameter×6 mm high cylindrical balls. Approximately ½ of the 1 L ball mill volume was filled for the grinding operation. After milling, microscopic observation showed reduction of particle size from 30–50 microns to 1–10 microns. The dispersion was then prepared by adding 2.35 parts Maquat SC-18 (85% active) to 37.65 parts deionized water and stirring until dissolved. A total of 40 parts of TTA-P was then added to the surfactant solution in 5 part increments with stirring, followed by agitation with a sonic dismembrator, (Fisher Model 3000). The sonic probe was inserted directly into the suspension and run on the highest setting for 1–2 minutes. A creamy dispersion resulted initially, with viscosity increasing with increasing solids content. The final suspension was a uniform paste with a concentration of 50% by weight solids.

EXAMPLE 5

Preparation of Inhibited Cationic Aqueous Rotogravure Ink Formulation with TTA-P A blue aqueous inhibitor ink was prepared by adding 0.20 parts of CIB 103 Blue Pigment (sold by Penn Color, Inc.) to 20 parts of CIE 94 Extender (sold by Penn Color, Inc.) and stirring to uniform coloration. Then 6.06 parts of the 50% suspension of TTA-P (prepared in Example 4) was then added to the ink mixture and stirred to uniform coloration. Although a slight viscosity drop was observed the mixture remained colloidally stable and disperse.

EXAMPLE 6

Preparation of an Anionic Dispersion of TTA-P

An anionic dispersion paste of TTA-P was prepared with a polyoxyethylene branched nonylphenyl ether phosphate surfactant, (Rhodofac PE-50, Rhone Poulenc). Diminutization of the compound was performed by milling as described in Example 4. Dispersion of the compound was accomplished using the sonic dismembrator, also described in Example 4. Materials were combined in the proportion: 40 parts of deionized water, 2.06 parts of the surfactant and 40 parts of TTA-P. Materials were added in the listed sequence. A stable, homogenous paste, 48.7% TTA-P, resulted. Microscopic observation showed particles approximately 1–3 microns in diameter.

EXAMPLE 7

Preparation of an Inhibited Anionic Aqueous Rotogravure Ink Formulation with TTA-P The anionic dispersion of TTA-P (Example 6) was added to an anionic ink formulation of Sicpa Corp. The resultant mixture consisted of 20 parts Sicpa Extender 694556, 0.20 parts Sicpa black ink 674554 and 6.06 parts of the 48.7% dispersion of the compound (Example 6). The mixture was stirred to a smooth and uniform consistency, and was observed to be colloidally stable.

EXAMPLE 8

Preparation of a Cationic Dispersion of BTA-P

A portion of BTA-P, the benzotriazole-piperazine derivative, was stably dispersed with the cationic surfactant stearyldimethylbenzylammonium chloride, (Maquat SC-18, Mason Chemical Co.). The compound was milled and dispersed as in Example 4. The materials were combined in the proportion: 20 parts deionized water, 1.18 parts Maquat SC-18, (85% active), and 33.16 parts BTA-P. The materials were added in the listed sequence. A stable homogenous paste resulted. The paste was 61% by weight of BTA-P.

EXAMPLE 9

Preparation of an Inhibited Cationic Aqueous Rotogravure Ink Formulation with BTA-P The cationic dispersion of BTA-P (Example 8) was added to a cationic ink formulation of Penn Color. The mixture consisted of 20 parts Penn Color Extender CIE 94, 0.20 parts Penn Color CIB 103 blue ink and 4.96 parts of the 61% dispersion of BTA-P (Example 8). The mixture was stirred to a smooth and uniform consistency and was observed to be colloidally stable.

EXAMPLE 10

Preparation of a Cationic Dispersion of HTTA-P

A portion of HTTA-P, the hydrogenated tolyltriazolepiperazine derivative, was colloidally dispersed with the cationic surfactant stearyldimethylbenzylammonium chloride, (Maquat SC-18, Mason Chemical Co.). The milling and dispersing procedures of Example 4 were followed. The materials were combined in the proportion: 21 parts deionized water, 1 part Maquat SC-18, (85% active), and 37 parts HTTA-P. The materials were added in the listed sequence. A stable homogenous paste resulted. It was observed to be rheopectic, (shear thickening). The paste was 62.7% by weight of HTTA-P.

EXAMPLE 11

Preparation of an Inhibited Cationic Aqueous Rotogravure Ink Formulation with HTTA-P The cationic dispersion of HTTA-P (Example 10) was added to a cationic ink formulation of Penn Color. The mixture consisted of 20 parts Extender CIE 94, 0.20 parts CIB 103 blue ink and 4.83 parts of the 62.7% dispersion of HTTA-P (Example 10). The mixture was stirred to a smooth and uniform consistency and was observed to be colloidally stable.

EXAMPLE 12

Direct Addition of TTA-P to an Aqueous Cationic Ink Formulation

Hitherto, dispersion of these new inhibitors directly into the ink formulation was not considered. The instability problems of other triazole inhibitors seemed to indicate that a surfactant in addition to that found in the ink and extender was required. But since such stable ink mixtures were obtained with addition of the charged dispersions it was thought to attempt the dispersion of a new triazole inhibitor directly into an ink mixture. The attempt was successful. To 20 parts of Extender CIE 94 were added 0.20 parts of CIB 103 blue ink and the mixture was stirred to a smooth uniform coloration. Three parts of the milled tolyltriazole-piperazine derivative, TTA-P (Example 4) were added directly to the ink mixture and the mixture was sonicated to a smooth consistency. Sonication was performed discontinuously to avoid overheating and coalescence of extender latexes. A homogenous and stable mixture was obtained.

EXAMPLE 13

Direct Addition TTA-P to an Aqueous Anionic Ink Formulation

To 20 parts of Sicpa extender 694556 was added 0.20 parts of Sicpa 674554 black ink and the mixture was stirred to a uniform coloration. Three parts of TTA-P (as prepared in Example 4) were added and the mixture was sonicated to a smooth consistency. A homogenous and stable mixture was obtained.

EXAMPLES 14-19

Printing of Inks and Resultant Embossing

The inks prepared in Examples 5, 7, 9, 11, 12 and 13 were printed on 9 mils of an expandable plastisol coated on flooring felt using a flat-bed gravure proof press. The plastisol formulation was 100 parts PVC resin, 50 parts plasticizers, 30 parts limestone filler, 7.0 parts titanium dioxide pigment, 3.0 parts mineral spirits viscosity modifier, 2.1 parts stabilizers, 2.0 parts azodicarbonamide blowing agent and 0.6 parts zinc oxide blowing agent activator. The inks printed and dried satisfactorily without any tack.

The printed samples were coated with 10 mils of a clear plastisol and heated for 1.3±0.1 minutes at an air temperature of 201°±1° C. in a Werner Mathis oven to expand the 9 mil layer to about 25 mils. The clear plastisol formulation was 100 parts PVC resin, 40 parts plasticizers, 4.0 parts stabilizers and 4.0 parts mineral spirits viscosity modifier.

The thickness of the printed coated areas (i.e., restricted area) was measured in mils and compared to the thickness of the unprinted expanded surrounding areas. This difference is reported as the depth of chemical embossing and is shown in Table I.

TABLE I

| EXAMPLE | Ink | Weight Percent of Compound in Ink | Chemical Embossing Depth in mils |
|---|---|---|---|
| 14 | Cationic Ink (Example 5) | 11.54% TTA-P | 10.0 |
| 15 | Anionic Ink (Example 7) | 11.24 TTA-P | 9.1 |
| 16 | Cationic Ink (Example 9) | 12.03 BTA-P | 7.5 |
| 17 | Cationic Ink (Example 11) | 12.10 HTTA-P | 8.5 |
| 18 | Cationic Ink (Example 12) | 12.93 TTA-P | 10.6 |
| 19 | Anionic Ink (Example 13) | 12.93 TTA-P | 10.8 |

EXAMPLE 20

Direct Milling of BTA-P In an Aqueous Cationic Ink Formulation

The following procedure was developed to see if the present inhibitors could be directly milled into water-based ink systems. Instead of pregrinding and then dispersing the inhibitor as was done in Example 4, the compound from Example 2 (BTA-P) was ground and dispersed in situ in the water-based ink extender. A sixteen ounce HDPE bottle was filled halfway with a mixture of 12 mm diameter spherical and 6 mm diameter×6 mm high cylindrical ceramic balls. To the bottle was added 21.6 grams of the coarse powder of BTA-P and then 158.4 grams of extender CIE 94 from Penn Color, Inc. This gave a concentration of 12% by weight of BTA-P and room to adjust the concentration and viscosity with water and more extender.

The charged mill was rolled overnight (about 18 hours) and checked for the quality of the grind. A homogeneous stable dispersion was obtained and under microscopic observation showed particle size reduction from over 50 microns to less than 10 microns. The ceramic balls were separated from the dispersion and the dispersion adjusted to about 10% by weight concentration of BTA-P with water and additional extender to a viscosity of 15 seconds with a #3 Zahn Cup. The morphology of the compound and lack of solubility in the ink, lends itself to be readily ground and dispersed in situ.

| Formulation Before Milling | Formulation After Milling and Adjusting Viscosity |
|---|---|
| 88 parts Extender CIE 94 | 79. parts Extender CIE 94 |
| 12 parts BTA-P | 9.6 parts BTA-P |
|  | 10.6 parts Water |

EXAMPLE 21

Preparation of 1,3-Bis(Benzotriazol-1'-yl Methyl) Urea (BTA-U)

In a flask, were combined with stirring 119 parts of benzotriazole and 30 parts of urea in a solution of 150 parts of water and 200 parts of glacial acetic acid at room temperature. To the resulting clear, pale yellow solution that had cooled to about 15° C., from dissolution of urea and benzotriazole, was added in about one hour 89 parts of aqueous 37% formaldehyde. Approximately ⅔ through the addition of formaldehyde, a finely divided white solid began to precipitate. Upon completing the addition, the reaction temperature had risen to 35° C. Stirring was continued for several hours.

After about 16 hours at room temperature, the reaction mixture was suction filtered. The white solid filter-cake was washed consecutively with portions of a 50/50 (by vol.) aqueous/acetic acid solution and finally water. Air drying of the washed filter-cake, followed by drying in vacuo (in presence of phosphorus pentoxide) provided 126 parts (78% yield) of a white solid, m.p. 221°–223° C. The material was identified by $^1$H and $^{13}$C NMR spectral analysis as 1,3-bis(benzotriazol-1'-yl methyl) urea.

EXAMPLE 22

Preparation of 1,3-Bis(5'-Tolyltriazol-1'-yl Methyl) Urea (5-TTA-U)

The previous reaction was repeated using 53.5 parts of 5-tolyltriazole and 10.5 parts of urea in 70 parts of acetic acid and 55 parts of water. To this stirred mixture was added 32.4 parts of aqueous 37% formaldehyde. The resulting reaction mixture was subsequently heated to 60° C. and maintained at this temperature for about 18 hours. The reaction mixture was allowed to cool to room temperature and washed consecutively with water, methanol and ether. After drying in vacuo, the product, 60 parts, melted at 184°–8° C., and was identified as 1,3-bis(5'-tolyltriazol-1'-yl methyl) urea (98% yield) by $^1$H and $^{13}$C NMR spectral analysis.

EXAMPLE 23

Preparation of 1,3-Bis(Benzotriazol-1-yl Methyl) N,N'-Dimethyl Urea (BTA-DMU)

To a solution of dry toluene (250 parts) and p-toluene sulfonic acid (1.7 parts) was added 8.8 parts of dimethyl urea and 59.6 parts of 1-(hydroxymethyl) benzotriazole. The stirred mixture was heated to reflux under a Dean-Stark trap and became clear. Refluxing was continued for 24 hours, after which time the reaction mixture was cooled to room temperature. The reaction mixture was washed consecutively with portions (50 parts) of aqueous 5% sodium carbonate, water and aqueous saturated sodium chloride and finally dried over anhydrous magnesium sulfate. The dried and filtered solution was concentrated at reduced pressure to provide a viscous oil. 1,3-Bis(benzotriazol-1'-yl methyl) N,N'-dimethyl urea was isolated from the oil, m.p. 137°–40° C. (reported m.p. 143°–4° C.). NMR spectral analysis of the product corresponded with that reported in the literature.

EXAMPLE 24

Preparation of 1,5-Bis(Benzotriazol-1'-yl Methyl) Biuret (BTA-B)

In a flask were combined with stirring 25.8 parts of biuret, 59.6 parts of benzotriazole and 200 parts of acetic acid. To this stirred mixture was added in about 30 minutes 44.6 parts of aqueous 37% formaldehyde. The reaction mixture was warmed to 50° C. and maintained at this temperature for about 18 hours. After cooling to room temperature, the reaction mixture was filtered with suction. The filter-cake, a white solid was washed consecutively with water, methanol and ether and finally dried in vacuo at 50° C. The dried product, m.p. 226°–9° C., was identified as 1,5-bis(benzotriazol-1-yl methyl) biuret by $^1$H and $^{13}$C NMR spectral analysis.

EXAMPLE 25

Preparation of 2,4,6-Tris(Benzotriazol-1'-yl Methyl)-s-Triazine (3BTA-M)

To a stirred mixture of melamine (37.8 parts) and 107.2 parts of benzotriazole in acetic acid (315 parts) and water (225 parts) was added in 20 minutes aqueous 37% formaldehyde (74.2 parts). Upon completing the addition, the stirred reaction mixture was heated to 45° C. and maintained for 19 hours. The reaction mixture was cooled and filtered with suction. The filter-cake was washed consecutively with water, methanol and ether and dried in vacuo at 55° C. The dried product, m.p. 226°–30° C., 130 parts (83.4% yield) was identified as 2,4,6-tris(benzotriazol-1'-yl methyl)-s-triazine by $^1$H and $^{13}$C NMR spectral analysis.

EXAMPLE 26

Preparation of 2,4-Bis(Benzotriazol-1'-yl Methyl) Benzoguanamine (BTA-BG)

In a similar manner to that described in the previous example 44.6 parts of aqueous 37% formaldehyde was added in 30 minutes to a stirred mixture of benzoguanamine (46.8 parts) and benzotriazole (59.6 parts) in 262.5 parts of acetic acid and 187.5 parts of water. Upon completing the addition, the reaction mixture was heated to 50° C. After about 18 hours the reaction mixture was cooled to room temperature and filtered. The filter-cake was washed consecutively with water, methanol and ether and dried in vacuo at 50° C. The dried product, m.p. 206-10° C, was identified as 2,4-bis(benzotriazol-1'-yl methyl) benzoguanamine by $^1$H and $^{13}$C NMR spectral analysis. A 88% yield (99 parts) was realized.

EXAMPLE 27

Preparation of 1-(1'-Benzenesulfonamido) Methyl Benzotriazole (BTA-BSA)

A mixture of benzenesulfonamide (47.2 parts) and 1-hydroxymethylbenzotriazole (46.2 parts) in 400 parts of dry toluene was refluxed under a Dean-Stark trap. After about 24 hours, a near theoretical amount (5.1 parts) of water had formed. The reaction mixture was cooled to room temperature. A white solid present was filtered, washed with fresh toluene and dried in vacuo to provide 80.6 parts (93.2 % of theory) of 1-(1'-benzenesulfonamido) methyl benzotriazole. The product melted at 180°–3° C. (reported m.p. 183°–6° C.) and was further characterized by $^1$H and $^{13}$C NMR.

EXAMPLE 28

Preparation of 1-(1'-Methanesulfonamido) Methyl Benzotriazole (BTA-MSA)

In a similar manner a mixture of methanesulfonamide (47.6 parts) and 1-hydroxymethylbenzotriazole (74.5 parts) in 260 parts of dry toluene was heated at reflux until about 8 parts of water had formed (theoretical 9 parts). The crude solid reaction product was recrystallized from an ethanol/MEK mixture. The recrystallized product, m.p. 161°–4° C., was identified as 1-(1'-methanesulfonamido) methyl benzotriazole (98% yield) by $^1$H and $^{13}$C NMR spectral analysis.

EXAMPLE 29

Preparation of 4-(Benzotriazol-1'-yl Methyl) Hydantoin (BTA-H)

To a stirred mixture of 50 parts hydantoin and 60.7 parts benzotriazole in 400 parts of acetic acid was added 41.4 parts of aqueous 37% formaldehyde. Upon completing the addition, the reaction mixture was refluxed for 36 hours. The cooled, clear amber reaction mixture was concentrated on a Rota-vap to ½ volume. Cooling the concentrate gave a white solid. The solid was filtered, washed consecutively with water, methanol and ether and dried in vacuo. The dried product was identified as 4-(benzotriazol-1'-yl methyl) hydantoin by m.p. 245°–50° C. (reported m.p. 235°–6° C.) and $^1$H and $^{13}$C NMR spectral analysis.

EXAMPLE 30

Preparation of 1-(1'-(2'-oxopyrrolidin-1'-yl)-Ethyl) Benzotriazole (BTA-PY)

The previous reaction was repeated using 55.6 parts of 1-vinyl-2-pyrrolidin-2-one, 58.5 parts of benzotriazole, 300 parts of chloroform and 0.95 parts of p-toluenesulfonic acid monohydrate. The expected product, 1-(1'-(2'-oxopyrrolidin-1'-yl)ethyl) benzotriazole, m.p. 74°–5° C. (reported m.p. 74°–5° C.), was obtained in 92% yield.

EXAMPLE 31

Preparation of N, N-Bis(Benzotriazol-1-yl Methyl) Hydroxylamine (BTA-NOH)

To a stirred solution of 1-(hydroxymethyl)benzotriazole (44.8 parts) in 375 parts of methanol at room temperature was added 10.4 parts of hydroxylamine hydrochloride. The reaction mixture was stirred at room temperature for about five hours and then placed in a freezer for about six hours. The precipitated white solid was filtered, washed with cold water and dried in vacuo (in presence of phosphorus pentoxide). The dried product, m.p. 175°–7° C. (reported m.p. 173°–4° C.), 24 parts: was identified as N,N-bis (benzotriazol-1-yl methyl) hydroxylamine (54.2% yield) by $^1$H and $^{13}$C NMR spectral analysis.

EXAMPLE 82

Preparation of 1,8-Bis(Benzotriazol-1-yl Methyl) Thiourea (BTA-TU)

To a stirred mixture of benzotriazole (119 parts) and thiourea (88 parts) in 800 parts of acetic acid at room temperature was added 89 parts of aqueous 87% formaldehyde in about one hour. Upon completing the addition, the reaction mixture was heated to about 55° C. After 12 hours at 55° C., the reaction mixture was cooled to room temperature and the solid present was suction filtered. The filter-cake was washed consecutively with water, methanol and ether. The solid product was dried in vacuo to provide 161 parts (95% yield) of 1,3-bis(benzotriazol-1-yl methyl) thiourea, m.p. 220°-2° C. (reported m.p. 205°-6° C.), and identified by $^1H$ and $^{13}C$ NMR spectral analysis.

EXAMPLE 33

Preparation of N,N-Bis(Benzotriazol-1-yl Methyl) Glycine (BTA-G)

One hundred nineteen and three tenths parts of 1-(Hydroxymethyl) benzotriazole and glycine (30 parts) were added to 600 parts of dry toluene containing 1.7 parts of p-toluenesulfonic acid. The mixture was stirred and refluxed under a Dean-Stark trap. After about 4.5 hours, the theoretical amount of water (14.4 parts) had collected and heating was suspended. The reaction mixture was cooled in ice-water and the tan solid that had formed was filtered with suction. After washing the filter-cake consecutively with toluene and ether and drying it in vacuo, 116 parts of N,N-bis(benzotriazol-1-yl methyl) glycine were obtained and identified by $^1H$ and $^{13}C$ NMR spectral analysis. The product melted at 163°-6° C. and was obtained in 86% yield.

EXAMPLE 34

Preparation of N-(Benzotriazol-1-yl Methyl)-4'-Carboxybenzene Sulfonamide (BTA-4CBSA)

To a stirred mixture of benzotriazole (23.8 parts) and 4-carboxybenzene sulfonamide (40.2 parts) in acetic acid (250 parts) was added 17 parts of aqueous 37% formaldehyde in 25 minutes. The resulting reaction mixture was heated to 55° C. After about 18 hours at 55° C., the reaction mixture was cooled to room temperature and the white solid present was filtered with suction. The filter-cake was washed consecutively with portions of water, methanol and ether. After drying in vacuo, 60 parts of a solid melting at 258°-61° C. was obtained. The solid was identified as N-(benzotriazol-1-yl methyl )-4'-carboxybenzene sulfonamide (90% of theory) by $^1H$ and $^{13}C$ NMR spectral analysis.

EXAMPLE 35

Preparation of 1(1',5'-Naphthalene Disulfonamido) Methyl Benzotriazole (BTA-NDSA)

To a solution of dry toluene (400 parts) and p-toluene sulfonic acid (0.5 parts) was added 42.9 parts of 1,5-naphthalene disulfonamide and 46.2 parts of 1-(hydroxymethyl) benzotriazole. The stirred reaction mixture was heated under reflux under a Dean-Stark trap and refluxing was continued for 8 hours. The reaction mixture was cooled, filtered and washed with cold methanol. Attempts to recrystallize the material were unsuccessful due to the insolubility of the product in many organic solvents (hot and cold). The material was heated in methanol and filtered hot. The white solid was dried in a vacuum oven and yielded 58.5 parts of a material with a melting range of 245°-50° C. with darkening. The material was identified as 1(1',5'-naphthalene disulfonamido) methyl benzotriazole by $^1H$ and $^{13}C$ NMR spectral analysis, run in DMSO-d6.

EXAMPLE 36

Preparation of 1(1',3'-Benzene Disulfonamido) Methyl Benzotriazole (BTA-BDSA)

To a solution of dry toluene (400 parts) and p-toluene sulfonic acid (0.5 parts) was added 38.7 parts of 1,3-benzene disulfonamide and 50.5 parts of 1-(hydroxymethyl) benzotriazole. The stirred reaction mixture was heated under reflux under a Dean-Stark trap and refluxing was continued for 8 hours. The reaction mixture was cooled, filtered and washed in boiling methanol. Attempts to recrystallize the material were unsuccessful due to the insolubility of the product in many organic solvents. The precipitate was dried in a vacuum oven to yield 41.8 parts of a material which began to darken at 240° C. and melted in the range of 255°-60° with gas evolution. The material was identified as 1(1',3'-benzene disulfonamido)methyl benzotriazole by $^1H$ and $^{13}C$ NMR spectral analysis, run in DMSO-d6.

EXAMPLE 37

Preparation of 1-Bis(Benzotriazol-1'-yl Methyl)-2-Benzoyl Hydrazide (BTA-HYR)

A mixture of benzoic hydrazide (42.7 parts) and hydroxymethylbenzotriazole (104.4 parts) in 600 parts of dry benzene was heated to reflux with stirring. After about 4 hours, approximately 80% of the theoretical amount of water had formed and the heating was terminated. Upon cooling, a white solid that had formed was filtered with suction, washed consecutively with portions of methanol and ethyl ether and finally dried in vacuo. The dried product, 132.4 parts, m.p. 217°-220° C. was identified as 1'-bis(benzotriazol-1'-yl methyl)-2-benzoyl hydrazide (95% yield)) by $^1H$ and $^{13}C$ NMR spectral analysis.

EXAMPLE 38

Preparation of Bis(Benzotriazol-1-yl Methyl) Amine (BTA-A)

An aqueous 2% ammonia solution (265 parts) was neutralized with acetic acid using phenolphthalein indicator. To the resulting solution at 25° C. was added a solution of hydroxymethylbenzotriazole (74.6 parts) in about 600 parts of methanol. The reaction mixture was stirred at 25° C. for 5 hours and then placed in a freezer (−5° C.) overnight.

The solid precipitate that formed was filtered, washed with ice water and dried in vacuo in the presence of phosphorus pentoxide. The dried white solid, 15.8 parts, melted at 182°-5° C. The main methanol filtrate was concentrated to ½ its original volume and then cooled in the freezer. The ice cold concentrate was filtered and the filter-cake treated as described above provided 18.6 parts of a white solid, m.p. 182°-5° C. The combined solids, 34.4 parts, was identified as bis(benzotriazol-1-yl methyl) amine (49% of theory) by $^1H$ and $^{13}C$ NMR spectral analysis.

EXAMPLE 39

Preparation of 1,3-Bis(5'-Butyl Benzotriazol-1'-yl Methyl) Urea (5-BBTA-U)

Urea (8.6 parts) and 5-butyl benzotriazole (50.0 parts) were added to 100 parts of glacial acetic acid. Aqueous 37% formaldehyde (23.1 parts) was added dropwise and upon completion of addition, the mixture was heated to 60° C. and stirred overnight at this temperature. The system was cooled and the precipitate was suction filtered, washed with water and dried in a vacuum oven to yield 36.2 parts of solid melting at 157°–161° C.

EXAMPLE 40

Preparation of N,N'-Bis(Benzimidazol-1-yl Methyl) Piperazine (BI-P)

Benzimidazole (121.7 parts) and 43.1 parts of piperazine were mixed in 600 parts of methanol and cooled to 0° C. While holding the reaction mixture at 0° to 12° C., 81.2 parts of commercial aqueous 37% formaldehyde solution were added over several hours with continuous stirring. After addition, the system was allowed to warm to room temperature. The system was allowed to stand overnight and then suction filtered. The solid was washed with methanol and placed in a vacuum oven to yield 162.0 parts of material melting at 250°–3° C.

COMPARATIVE EXAMPLE 41

Preparation of N-[1-(Benzotriazol-1'-yl Phenyl] Amide (BTA-PA)

Benzamide (60.6 parts) and 1-hydroxymethyl benzotriazole (74.5 parts) were added to 250 parts of dry toluene and stirred as a thick slurry. The mixture was heated to reflux and the water was collected in a Dean Stark tube. The solution became clear and was slightly pale yellow in color. After 4 hours of reflux, 9.0 parts of water had been collected. The solution was cooled overnight to obtain a solid mass of white crystals. The mixture was reheated until all solid dissolved and was cooled slowly. After reaching room temperature, the mixture was cooled in a refrigerator and the solid was collected by suction filtration. The solid was washed with ice cold toluene and dried. The yield was 86.4 parts (64%) of a solid, m.p. 170°–2° C. (literature value is 174° C.).

COMPARATIVE EXAMPLE 42

Preparation of 1-(1'-(Carbazo-9'-yl)Ethyl) Benzotriazole (BTA-C)

A stirred mixture of 30.8 parts benzotriazole, 50 parts N-vinylcarbazole, 250 parts chloroform and 1.0 part p-toluene sulfonic acid monohydrate was heated to reflux. After several hours, the red-orange colored reaction mixture was cooled to room temperature and washed three times with 200 parts of water. The red-orange color was discharged during the washing and the pale yellow chloroform layer was dried over anhydrous magnesium sulfate. The dried chloroform solution was filtered and the solvent subsequently removed on a Rots-yap at reduced pressure to leave a viscous oil. The residual oil was cooled and slurried with ether to provide a white solid. The solid was filtered and dried to provide 51.5 parts (63.7% yield) of 1-(1-(carbazo-9'-yl)ethyl) benzotriazole m.p. 156°–60° C. (reported m.p. 147° C.). Structural confirmation was made by $^1$H and $^{13}$C NMR spectral analysis.

COMPARATIVE EXAMPLE 43

Preparation of 1,2-Bis(Benzotriazol-1'-yl) Ethane (BTA-D)

1-Chloromethyl benzotriazole was prepared using the procedure outlined in JACS 74, 3869 (1952). Solid 1-hydroxymethyl benzotriazole (45.0 parts) was stirred mechanically and thionyl chloride (130 parts) was added dropwise at a fairly rapid rate so that the slurry could be agitated while immersed in an ice bath. A nitrogen sweep was employed so that the gasses evolved could be bubbled through a dilute sodium hydroxide solution. After all of the thionyl chloride had been added, the mixture was allowed to warm to room temperature. The mixture was heated to 40° C. and gas evolution became vigorous and the caked-up solid dissolved to yield a clear, pale yellow solution. The mixture was warmed to 65° C. where it was held for 60 minutes. Excess thionyl chloride was distilled off slowly and when distillation ceased, the mixture was cooled to 35°–40° C. and 100 parts of methanol was added to scavenge any residual thionyl chloride. The solution was warmed to reflux and the precipitated solid was broken up with a stirring rod. After 15 minutes at reflux the solution was cooled in an ice bath for 30 minutes and the pale brown solid was filtered and dried in a vacuum oven. The yield of 1-chloromethyl benzotriazole was 41.6 parts (82.9% yield), m.p. 137°–139° C., literature 136°–8° C.

Benzotriazole (28.4 parts) and sodium amide (9.8 parts) were mixed and stirred in 500 parts of dry toluene to form a course suspension. On heating to reflux, the mixture rapidly took on a more homogenous appearance of a thick cream. The mixture was refluxed 3 hours and then cooled slightly to allow addition of the powdered 1-chloromethyl benzotriazole in one portion. The suspension was heated back to reflux and left to stir overnight. After 19 hours at reflux, the reaction mixture had turned to a dark brown liquid with a slurry of finely divided off-white solid. The system was cooled to room temperature and then refrigerated to complete precipitation of the products. The solid was collected by suction filtration, washed well with cold toluene and air dried briefly to give a pale brown, powdery solid. The solid was stirred for 30 minutes in 200 parts of water to wash out the sodium chloride, filtered and dried in a vacuum oven at 60°–5° C. The final product was 18 parts of a fine, very pale brown solid (30% yield), m.p. 192°–4° C., literature 192°–3° C.

Table II sets forth a number of properties of the examples and comparative examples which were made and tested. Most of these compounds were prepared using the direct milling procedure and then evaluated for inhibitor activity, ghosting and embossing definition.

The inhibited inks (at 10% by weight inhibitor concentration) were printed on 7 mils of an expandable plastisol coated onto a glass mat which was saturated with a non-expandable plastisol. This was done on a flat-bed gravure proof press using a 100 line screen step-wedge gravure plate. The steps ranged from a deep shadow tone to a shallow highlight tone. The inks printed and dried without any tack.

The printed samples were coated with 10 mils of a clear plastisol wearlayer and heated for 1.9±0.1 minutes at an air temperature of 185°±2° C. in a Werner. Mathis oven to fuse and expand the foamable plastisol to about 14 mils (a 2:1 blow ratio). The thickness of the printed coated areas (i.e., restricted area) was measured in mils and compared to the thickness of the expanded unprinted surrounding areas. This difference was recorded as depth of chemical embossing and was used along with the degree of expansion in the inhibited area to access the inhibitor activity (IA).

The inhibitor activity of the BTA-P derivative was established as the benchmark and on a scale of 1 to 5 was given a rating of 1 (five on the scale being less than one mil of overall chemical embossing). This is a subjective ranking where the other compounds were evaluated for inhibitor activity by comparing them to BTA-P, both numerically and visually.

Those compounds showing good inhibitor activity were also evaluated for nonghosting characteristics. Ghosting is a result of "in roll" migration of the inhibitor from one printed surface of a rolled sheet into the lap above. Migration and ghosting also occurs in the other direction (i.e., to the lap below) but not as rapidly. The result of this fugitive migration is an embossed image (ghost embossing) showing up after expansion in an area not printed with the inhibited ink. This phenomenon is readily seen with inhibitors like benzotriazole and tolyltriazole in rolls of printed flooring structures after a few hours or days. Structures that have vinyl plastisol throughout are more prone to this problem.

To speed up the evaluation of ghosting, a bench top test was developed. Printed samples were held under pressure at an elevated temperature of 120° F. for the desired period of time at 1.4 psi. A multi-layer sample stack was compressed between two ¾ inch plywood boards to distribute the pressure uniformly. This simulated the conditions rolls of printed material could be stored under before expansion. The elevated temperature accelerated the migration and showed results in hours or days rather than days or weeks at room temperature.

Testing consisted of printing the inhibited inks on the flooring structure, as described previously with respect to inhibitor activity, using a grout line engraved plate on a flat-bed gravure proof press. Printed samples were sandwiched between unprinted sheets of the same flooring structure and placed in an air-circulating oven under heat and pressure. Unprinted sheets were used to make it easier to see ghosting when it first started to occur.

The samples were removed from the oven over a period of time (e.g., hours, days or weeks) and expanded in a Werner Mathis oven at 185°±2° C. for 1.9±0.1 minutes. The top and bottom unprinted sheets were evaluated for signs of ghosting. When ghosting occurred, a slight to severe embossed image of the grout line could be seen.

N=None.

SL=Slight, faint discontinuous print image with very little embossing.

M=Moderate, faint continuous print image with little embossing.

S=Severe, ghost embossing nearly equal to the direct printed samples.

In addition to evaluating ghosting over time, embossing definition can also be evaluated using the printed sheets from the ghosting test. The printed sheets were expanded at the same time intervals as the unprinted ghosting sheets and evaluated for depth and sharpness of the printed/embossed image. It was found that those inhibitors with severe ghosting characteristics (e.g. BTA and TTA) showed poor embossing definition over time. This is attributed to the lateral migration of the inhibitor and the depletion of the inhibitor in the print area.

TABLE II

| EXAMPLE | IA[a] | MW | MP°C. | GHOSTING[b] | SOLUBILITY % BY WT[c] | |
|---|---|---|---|---|---|---|
| | | | | | $H_2O$ | iPrOH |
| TTA-P | 1 | 376.4 | 194–7 | N | 0.031 | 0.204 |
| BTA-P | 1 | 348.4 | >215 | N | 0.001 | 0.007 |
| HTTA-P | 1 | 388.4 | 145 | N | — | — |
| BTA-U | <1 | 322.3 | 221–3 | N | 0.002 | 0.08 |
| 5-TTA-U | 3 | 350.3 | 184–8 | — | — | — |
| BTA-DMU | 3 | 350.4 | 137–40 | SL | — | — |
| BTA-B | 4 | 365.3 | 226–9 | — | — | — |
| 3BTA-M | 3 | 519.5 | 226–30 | — | — | — |
| BTA-BG | 4 | 449.4 | 206–10 | — | — | — |
| BTA-BSA | 1 | 289.3 | 180–3 | S | 0.05 | 0.59 |
| BTA-MSA | 5 | 226.3 | 162–4 | — | — | — |
| BTA-H | 5 | 231.2 | 245–50 | — | — | — |
| BTA-PY | 5 | 230.3 | 82 | — | — | — |
| BTA-NOH | <1 | 295.3 | 175–7 | S | 0.08 | 1.08 |
| BTA-TU | 2 | 338.3 | 220–2 | N | 0.001 | 0.011 |
| BTA-G | >1 | 337.4 | 167–9 | S | 0.69 | 0.914 |
| BTA-4CBSA | >1 | 332.3 | 258–61 | SL | 0.011 | 0.137 |
| BTA-NDSA | 1 | 548.0 | 245–50 | N | 0.051 | 0.051 |
| BTA-BDSA | >1 | 498.0 | 240–50 | N | 0.089 | 0.120 |
| BTA-HYR | 1 | 398.4 | 217–20 | N | 0.006 | 0.019 |
| BTA-A | >1 | 279.3 | 182–5 | S | 0.039 | 0.028 |
| 5-BBTA-U | 3 | 434.4 | 157–61 | — | — | — |
| BI[d] | 2 | 118.1 | 172–4 | S | 0.50 | 15.30 |
| BI-P | 1 | 346.0 | 250–3 | N | 0.053 | 0.211 |
| Comparative Examples | | | | | | |
| BTA-PA | N | 252.3 | 173–5 | — | — | — |
| BTA-C | N | 312.3 | 160 | — | — | — |
| BTA-D | N | 250.2 | 192–4 | — | — | — |
| BTA[e] | 2 | 119.2 | 98–9 | S | 1.98 | 53.9 |
| TTA[f] | 2 | 133.2 | 83–5 | S | 0.55 | 52.9 |
| TTA-HE[g] | 3 | 250.2 | 52–4 | S | abt 50 | >50 |

TABLE II-continued

| | | | | SOLUBILITY % BY WT[c] | |
|---|---|---|---|---|---|
| EXAMPLE | IA[a] | MW | MP°C. | GHOSTING[b] | H₂O | iPrOH |
| TTA-EH[h] | 2 | 386.2 | <25 | S | <0.01 | >50 |

[a]IA-Inhibitor Activity - 1 = Excellent, 2 - Very Good, 3 = Good, 4 - Fair, 5 = Poor and N = None
[b]N = None, SL = Slight and S = Severe (after 3 days)
[c]At room temperature for 24 hours
[d]Benzimidazole
[e]Benzotriazole
[f]Tolyltriazole
[g]1-Bis(β-hydroxyethyl)aminomethyltotyltriazole, Cmpd 1 of Hauser et al. (Reomet 42, sold by Ciba-Geigy)
[h]1-Bis(2-ethylhexyl)aminomethyltolyltriazole, generally disclosed by Hauser et al. (Reomet 39, sold by Ciba-Geigy)(Liquid at room temperature.)

Based on the solubilities of TTA-HE and TTA-EH, the solubilities of the compounds made by Hauser et al. are believed to be in excess of 10% by weight in isopropyl alcohol. Due to the extremely low solubilities of the present compounds in both water and alcohol, and the fact that they are solid particles at room temperature, they can be treated like pigments in any ink composition. The present compounds do not lead to instability of the ink and may be dispersed into the ink composition by either micronizing and dispersing or simultaneously grinding and dispersing.

The compounds of the prior art are either liquids at room temperature such as the azole compounds of Hauser et al. or are sufficiently soluble in water or alcohol to make it infeasible to mix the prior art inhibitors into the ink composition and then simultaneously grind and disperse them in the ink composition. Therefore the presently claimed insoluble azole inhibitors have a major commercial advantage over the prior art inhibitors.

While only one of the imidazole compounds has been tested, it is believed that the imidazole compounds corresponding to the triazoles compounds would be effective insoluble inhibitors based on the present disclosure and the disclosure of the Hauser et al. patent. However, the triazole compounds are preferred since at least some of the corresponding imidazole compounds appear to lead to less stable ink compositions. Surprisingly, the parent compound, benzimidazole, is an effective inhibitor even when compared to the benzimidazole derivative which has been made and tested.

We claim:

1. A printing ink composition comprising a resin, a solvent and an inhibitor; the inhibitor being a compound having the general formula

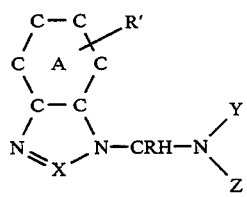

wherein the A ring is benzenoid, napthenoid or saturated cycloaliphatic, the A ring being unsubstituted or substituted with R' which is an alkyl group of 1 to 4 carbon atoms; R is a hydrogen atom or methyl radical; X is a nitrogen atom or the

group, wherein R" is a hydrogen atom or an alkyl group of 1 to 4 carbon atoms; and Y and Z are organic moieties or when taken together with the nitrogen to which they are attached form an organic ring structure; the inhibitor having a 24 hour room temperature isopropyl alcohol solubility of less than 5% by weight.

2. The ink composition of claim 1, wherein the inhibitor has a 24 hour room temperature aqueous solubility of less than 0.1% by weight.

3. The ink composition of claim 1, wherein the melting point of the inhibitor is at least about 100° C.

4. The ink composition of claim 3 wherein the melting point is at least about 150° C.

5. The ink composition of claim 4, wherein the melting point is at least about 200° C.

6. A printing ink composition comprising a resin, a solvent and an inhibitor; the inhibitor being selected from the group consisting of N,N'-bis(tolyltriazol-1-yl methyl) piperazine, N,N'-bis(benzotriazol-1-yl methyl) piperazine, N,N'-bis(cyclohexyltriazol-1-yl methyl) piperazine, and N,N'-bis(methylcyclohexyltriazol-1-yl methyl) piperazine; 1,3-bis(benzotriazol-1'-yl methyl) urea; 1,3-bis(5'-tolyltriazol-1'-yl methyl) urea; 1,3-bis(-benzotriazol-1'-yl methyl) N,N'-dimethyl urea; 1,5-bis(-benzotriazol-1'-yl methyl) biuret; 2,4,6-tris(benzotriazol-1'-yl methyl)-s-triazine; 2,4-bis(benzotriazol-1'-yl methyl) benzoguanamine; 1-(1'-benzenesulfonamido) methyl benzotriazole; 1(1'-methanesulfonamido(methyl benzotriazole; 4-(benzotriazol-1'-yl-methyl) hydantoin; 1-(1'-(2'-oxopyrrolidin-1'-yl) ethyl) benzotriazole; N,N-bis(benzotriazol-1-yl methyl) hydroxylamine; 1,3-bis(-benzotriazol-1'-yl methyl) thiourea; N,N-bis(benzotriazol-1-yl methyl) glycine; N-(benzotriazol-1-yl methyl)-4'-carboxy benzene sulfonamide; 1(1',5'-naphthalene disulfonamido) methyl benzotriazole; 1(1',3'-benzene disulfonamido) methyl benzotriazole; 1-bis(benzotriazol-1'-yl methyl)-2-benzoyl hydrazide; bis(benzotriazol-1-yl methyl) amine; 1,3-bis(5'-butyl benzotriazol-1'-yl methyl) urea; and 1,3-bis(benzimidazol-1'-yl methyl) piperazine.

7. A printing ink composition comprising a resin, a solvent and an inhibitor, the inhibitor being a compound having the general formula

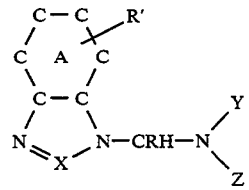

wherein the A ring is benzenoid, napthenoid or saturated cycloaliphatic, the A ring being unsubstituted or substituted with R' which is an alkyl group of 1 to 4 carbon atoms; R is a hydrogen atom or methyl radical; X is a nitrogen atom or the

group, wherein R" is a hydrogen atom or an alkyl group of 1 to 4 carbon atoms; Y is selected from the group consisting of hydrogen atom, an alkyl group of 1 to 4 carbon atoms, an hydroxyl moiety and a carboxy containing moiety; and Z is selected from the group consisting of methyl benzotriazole, methyl tolyltriazole, a carbonyl or thiocarbonyl linked methyl benzotriazole or methyl tolyltriazole containing moiety, and a sulfonyl linked moiety; or Y and Z taken together form a saturated ring compound containing a carbonyl group, or having a methyl benzotriazole or methyl tolyltriazole containing moiety attached thereto.

8. The ink composition of claim 1, wherein the solvent is water.

9. A printing ink composition comprising a resin, a solvent and an inhibitor, the inhibitor being a compound having the formula

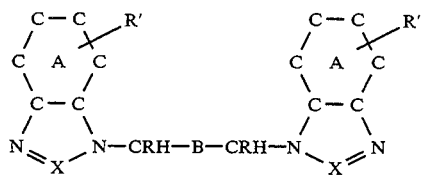

wherein the A ring is benzenoid, napthenoid or saturated cycloaliphatic, the A ring being unsubstituted or substituted with R' which is an alkyl group of 1 to 4 carbon atoms; R is a hydrogen atom or a methyl radical; X is a nitrogen atom or the

group, wherein R" is a hydrogen atom or an alkyl group of 1 to 4 carbon atoms; B is selected from the group consisting of NH, NOH and an organic moiety; and both C—B bonds are carbon/nitrogen bonds.

10. The ink composition of claim 9, wherein X is a nitrogen atom.

11. The ink composition of claim 9, wherein B is selected from the group consisting of organic substituted nitrogen, organic substituted nitrogen/carbonyl/nitrogen, organic substituted nitrogen/carbonyl/nitrogen/carbonyl/nitrogen, and organic substituted or unsubstituted saturated heterocyclic ring.

12. A printing ink composition comprising a resin, a solvent and an inhibitor; the inhibitor being a compound having at least two moieties selected from the group consisting of 1-methyl benzotriazole moiety, 1-ethyl benzotriazole moiety, 1-methyl benzimidazole moiety, 1-ethyl benzimidazole moiety, 1-methyl tolyltriazole moiety and 1-ethyl tolyltriazole moiety, the selected moieties being attached to one or more nitrogen atoms.

13. A printing ink composition comprising a resin, a solvent and an inhibitor; the inhibitor being a compound having at least one moiety selected from the group consisting of 1-methyl benzotriazole moiety, 1-ethyl benzotriazole moiety, 1-methyl tolyltriazole moiety and 1-ethyl tolyltriazole moiety, the selected moiety being attached to a nitrogen atom; and the inhibitor being a compound having at least one carboxy moiety.

14. A printing ink composition comprising a resin, a solvent and an inhibitor; the inhibitor being a compound having at least one moiety selected from the group consisting of 1-methyl benzotriazole moiety, 1-ethyl benzotriazole moiety, 1-methyl tolyltriazole moiety and 1-ethyl tolyltriazole moiety, the selected moiety being attached to a nitrogen atom; and the inhibitory being a compound having at least one sulfonyl moiety attached to a nitrogen atom.

15. A printing ink composition comprising a resin, a solvent and an inhibitor; the inhibitor being benzimidazole.

16. The ink composition of claim 15, wherein the solvent is water.

17. A compound of the formula

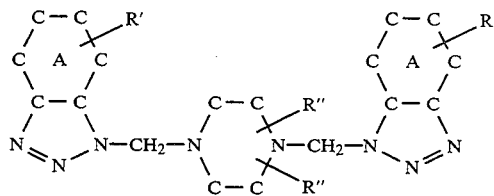

wherein the A ring is benzenoid and R' is a hydrogen atom or an alkyl group of 2 to 4 carbon atoms, or the A ring is saturated cycloaliphatic or napthenoid and R' is a hydrogen atom or an alkyl group of 1 to 4 carbon atoms, and R" is a hydrogen atom or an alkyl group of 1 to 4 carbon atoms; or the compound is selected from the group consisting of 1,3-bis(5'-tolyltriazol-1'-yl methyl) urea, 1,5-bis(benzotriazol-1'-yl methyl) biuret, 2,3,6-tris(benzotriazol-1'-yl methyl)-s-triazine; 2,4-bis(-benzotriazol-1'-yl methyl) benzoguanamine, N,N-bis(-benzotriazol-1-yl methyl) glycine, N-(benzotriazol-1-yl methyl)-4'-carboxybenzene sulfonamide, 1(1',5'-naphthalene disulfonamido) methyl benzotriazole, 1(1',3'-benzene disulfonamido) methyl benzotriazole, 1-bis(-benzotriazol-1'-yl methyl)-2-benzoyl hydrazide, bis(-benzotriazol-1-yl methyl) amine, 1,3-bis(5'-butyl benzotriazol-1'-yl methyl) urea and N,N'-bis(benzimidazol-1-yl methyl) piperazine.

* * * * *

UNITED STATES PATENT AND TRADEMARK OFFICE
CERTIFICATE OF CORRECTION

PATENT NO. : 5,441,563
DATED : August 15, 1995
INVENTOR(S) : Carl E. Sideman et al It is certified that error appears in the above-identified patent and that said Letters Patent are hereby corrected as shown below:

Column 2, line 24, before "Vol. 1(60)", insert --Series B--;

Column 3, line 35, before "cycloaliphatic", the words "and their" should appear after "imidazole";

Column 5, line 67, "2,3,6," should read --2,4,6--;

Column 12, line 58, "1-yl" should read --1'-yl--;

Column 13, line 23, "1-yl" should read --1'-yl--;

Column 15, line 1, "82" should read --32--; line 2, "1,8" should read --1,3--; line 2, "1-yl" should read --1'-yl--; line 6, "800" should read --300--; line 7, "87%" should read --37%--; line 13, "1-yl" should read --1'-yl--; line 6, "88" should read --38--;

UNITED STATES PATENT AND TRADEMARK OFFICE
CERTIFICATE OF CORRECTION

PATENT NO. : 5,441,563
DATED : August 15, 1995
INVENTOR(S) : Carl E. Sideman et al It is certified that error appears in the above-identified patent and that said Letters Patent are hereby corrected as shown below:

Column 17, line 64, "Rots-yap" should read --Rota-vap--; line 67, "1-(carbazo" should read --1'-(carbazo--;

Column 18, end of line 5, delete "("; line 6, before "bin-5)", insert --(--;

Column 20, Table II, under column heading "IA", line 10, "1" should read -->1--;

Column 24, claim 17, line 46, "2,3,6" should read --2,4,6--.

Signed and Sealed this

Twenty-fourth Day of October, 1995

Attest:

BRUCE LEHMAN

Attesting Officer          Commissioner of Patents and Trademarks